Aug. 30, 1932.  H. READ  1,874,349
PRECISION MEASURING TANK
Filed June 8, 1929  2 Sheets-Sheet 1

Inventor:—
Harry Read
by his Attorneys
Howson & Howson

Aug. 30, 1932.　　　　　H. READ　　　　　1,874,349
PRECISION MEASURING TANK
Filed June 8, 1929　　　2 Sheets-Sheet 2
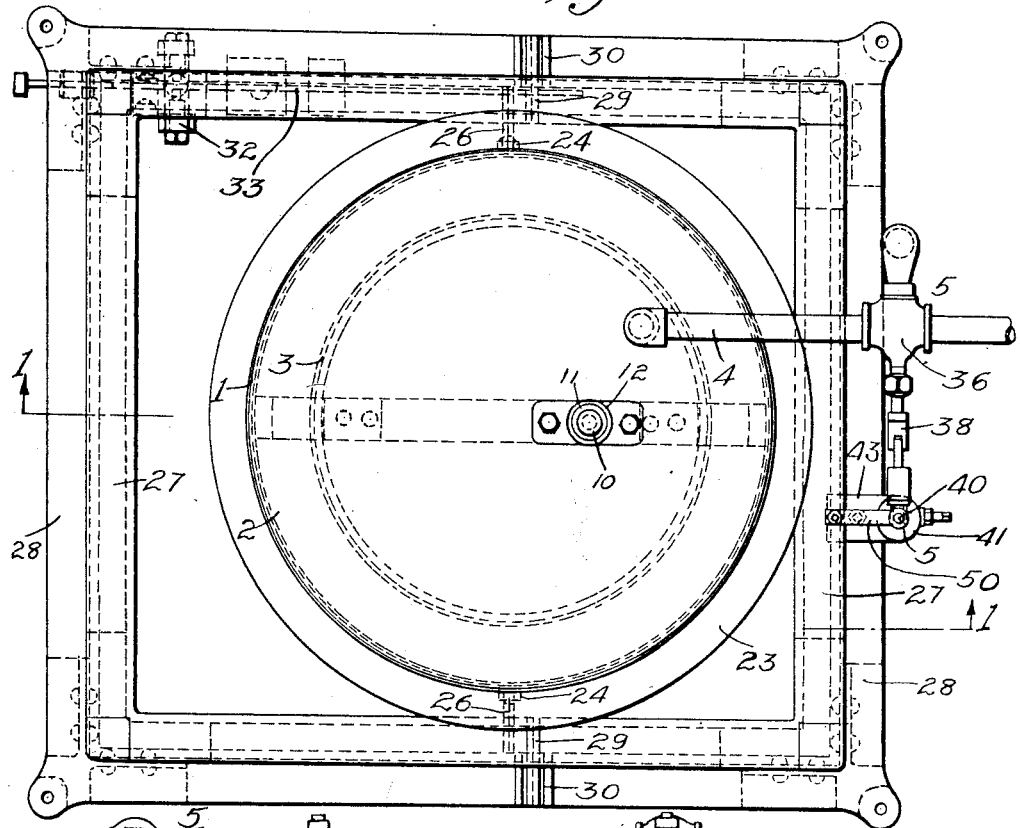
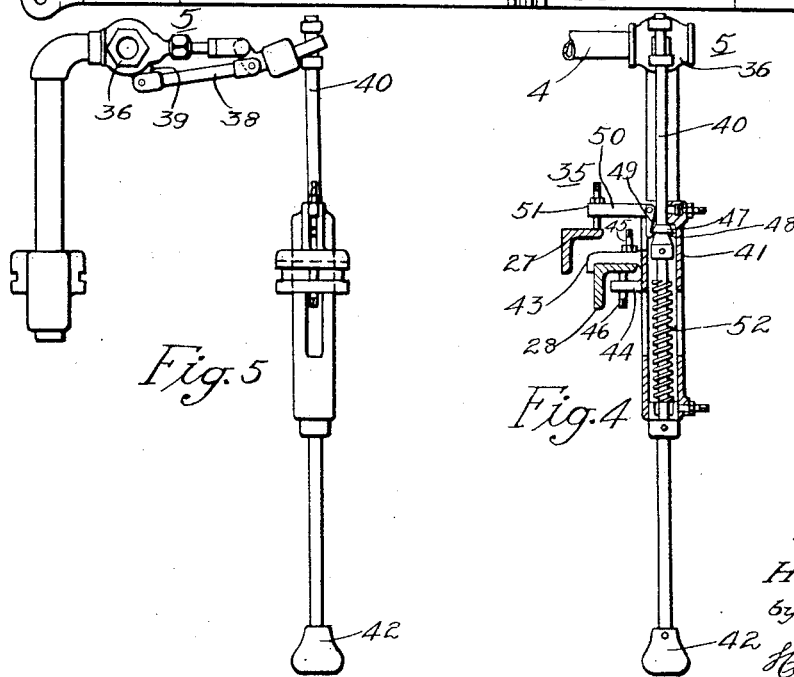
Inventor:—
Harry Read
by his Attorneys
Howson & Howson Patented Aug. 30, 1932

1,874,349

UNITED STATES PATENT OFFICE

HARRY READ, OF YORK, PENNSYLVANIA, ASSIGNOR TO READ MACHINERY COMPANY, OF YORK, PENNSYLVANIA, A CORPORATION OF PENNSYLVANIA

PRECISION MEASURING TANK

Application filed June 8, 1929. Serial No. 369,491.

This invention relates to a liquid measuring tank, and is more particularly concerned with a tank adapted to accurately determine the quantity of liquid flowing therein, and to automatically terminate the flow after the passage of a selected quantity.

It is broadly old to mount a tank on knife edges or the like, and to balance it, together with the liquid flowing therein, by means of an adjustable balance arm. In my invention this construction is improved, and an adjustable overflow pipe is arranged substantially vertically in the tank, to accurately determine the liquid level therein. The balance arm, of a type similar to that used in the prior art, is then set to counterbalance the tank with a slightly greater quantity of liquid therein than that for which the overflow has been set. Mechanism is preferably provided, which is operable when the balance arm and tank balance the thrust of each other to automatically terminate the flow of liquid to the tank.

An object of my invention, therefore, is to avoid the difficulties of the prior art.

Another object is to produce a precision liquid measuring apparatus.

Another object is to produce an extremely accurate liquid measuring apparatus, having means for automatically terminating the flow of liquid thereto after a selected quantity has been received.

Another object is to produce a liquid measuring tank set on knife edges and adapted to be counterbalanced by an adjustable balancing arm which is set for a quantity slightly in excess of the desired amount, and having a substantially vertically-adjustable overflow therein, arranged to exhaust the quantity of liquid in the tank above a selected level which defines the exact quantity desired.

Still another object is to devise a new and novel method of measuring liquids.

Yet another feature is resident in the details set forth in annexed specification.

Other objects will appear hereinafter.

In the drawings, in which is illustrated one form of my invention,

Fig. 2 is a plan view of the apparatus;

Fig. 4 is a detailed view, partly in section and partly in end elevation, of the tripping mechanism; while Fig. 5 is an elevation of the mechanism of Fig. 4, the mechanism being turned through approximately 90°.

Figures 1, 3:
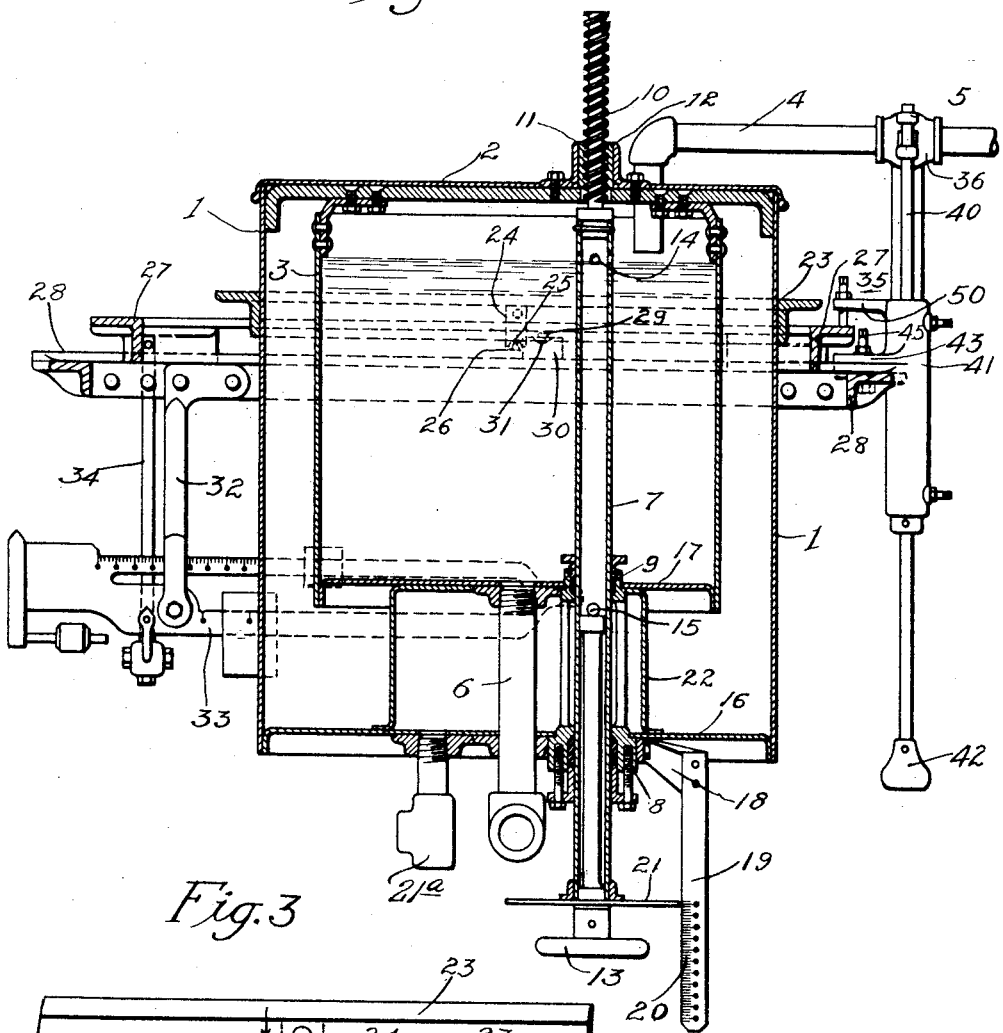
Fig. 1 is a vertical section through the tank and its accompanying mechanism, taken on the line 1—1 of Fig. 2.
Fig. 3 is a detail showing the arrangement of the knife edges of Figs. 1 and 2.

At 1 is shown an outer tank of any suitable construction, which is preferably provided with a lid or the like, such as shown at 2. Mounted in suitable manner, as on the interior of the cover 2, is a second tank 3, adapted, when the cover 2 is in place, to be arranged interiorly of the tank 1. Liquid may be supplied to the tank 3 from a suitable source of supply (not shown) by means such as a pipe 4, and in which, if desired, may be arranged a valve mechanism broadly indicated by the reference numeral 5. An exhaust pipe shown at 6 may be employed to drain the liquid from the tank 3.

As explained before, a feature of the invention is resident in an adjustable overflow member, the vertical height of which within the tank 3, may be regulated at will. To accomplish this end, a tubular casing illustrated at 7 is inserted upwardly through suitable packing glands 8 and 9 mounted on the bottom members of the tanks 1 and 3, respectively, and terminates at its upper end in a threaded rod-like portion 10 cooperating with the threads 11 of a suitable bushing 12, preferably mounted on the exterior of the cover member 2. An operating handle 13 is adapted to rotate the tubular member 7 and to thread the rod 10 through the bushing 12, thus adjusting the vertical height of a plurality of inlet openings 14, which latter are preferably arranged transversely about the member 7 in a plane at right angles to the longitudinal center-line thereof. Similarly, one or more outlet openings 15 are provided adjacent the lower extremity of the tubular member 7 at a point between the bottom members 16 and 17 of the tanks 1 and 3, respectively. Depending from the bottom member 16 from suitable means such as a bracket 18 or the like, may be a substantially vertically arranged scale 19 having indicia 20 located thereon. An indicating element 21 mounted on the tubular member 7 cooperates with the scale 20 to definitely determine the vertical height of the overflow inlet openings 14. Thus, when a predetermined or selected quantity of liquid has entered the tank 3, surplus liquid then overflows through openings 14 into the tubular member 7, and exiting through opening 15, passes outwardly through an exhaust pipe 21—a. A suitable casing preferably of cylindrical structure 22 may be mounted between the bottom members 16 and 17, and is adapted to restrain the surplus liquid in its passage to the exhaust pipe 21—a.

To insure an accurate determination of the desired quantity of liquid, advantage is taken of a mechanism somewhat similar to the balance system of the prior art, but which employs certain improvements thereover. To this end, the outer tank 1 has a circular frame 23 arranged thereabout, on which is mounted a plurality of bearing members 24, having substantially V-shaped slots 25 adjacent their lower end adapted to cooperate with supporting knife edges. The corresponding knife edges 26 are supported about a suitable frame preferably made of material of angle section, and indicated by the reference numeral 27. Because of the mounting on the knife edges 26, the frame 23 together with the tanks 1 and 2 are freely floating with respect to the rest of the apparatus. Rigidly mounted on a suitable framework is a third frame indicated at 28 on which are mounted a plurality of bearing members 30 adapted to support, in V-shaped slots 31 arranged therein, those knife blades 29 which comprise a second set mounted on the frame 27. Mounted in a suitable stirrup or the like 32, depending from the frame 28 is a balance arm or the like indicated by the reference numeral 33. This balance arm is of the conventional type, and may be preferably connected to the frame 27 by means of a tie-rod or the like 34.

As will be obvious from an inspection of Fig. 1, the weight on the frame 23 causes a downward thrust on the knife edges 26. The weight on the balance arm 33, however, pivoting as it does about the strap or hanger 32, causes an upward thrust on the knife edges 26, thus forcing the right end of the frame 27 downwardly. Assuming now that the scale 33 has been set to balance a quantity of liquid slightly in excess of that of the desired quantity, this liquid will flow uninterruptedly through the conduit or pipe 4 into the interior of the tank 3. Downwardly exerted force then will be built up on the knife edges 26, which force, after the desired quantity of water has entered the tank, will more than counterbalance the upward force of the scale beam 33 the frame 27 to pivot about the knife edge 29. This movement will actuate a tripping mechanism broadly indicated by the reference numeral 35 which is adapted to actuate the valve mechanism 5 to cut off the supply of liquid.

Referring more particularly to Figs. 4 and 5, it will be seen that the cut-off valve 36 is connected in any suitable manner to the supply pipe 4. A suitable linkage 38 connects the valve actuating lever 39 with a substantially vertically reciprocable rod 40, the action of which tends to move the lever from its open to its closed position or vice versa. This rod 40 is adapted to pass for a portion of its travel through a casing 41, and at its lower end is preferably provided with a suitable weight 42. The casing 41, as is obvious, is secured to the frame 28 by means of suitable brackets 43 and 44 and their corresponding set screws 45 and 46. Within the casing 41, the rod 40 is provided with a collar portion 47 having a rim or flange 48 adapted to be retained by a latch or pawl 49. This latch is preferably mounted on a lever arm 50 which, at its opposite end, may be provided with an adjustable abutment member 51 adapted to bear against the movable arm 27. Upward movement of the frame 27, as before described, causes the latch 49 to release the arm 40, which then falls downwardly under the influence of the counterweight 42, and operates the lever 39 through the linkage 38 to terminate the flow of liquid through the supply pipe 4. A coiled spring 52 is preferably mounted about the rod 40 within the casing 41, and abutting as it does at one end the inner face of the lower end of the casing 41, and at the other, the under face of the sleeve 47, has an action somewhat similar to that of the ordinary dash-pot, to prevent banging of the sleeve against the bottom of the casing.

In operation, the balance arm 33 is set to an indication somewhat in excess of the desired quantity of liquid. The overflow tube 7 is then adjusted to such a point that any liquid in the tank 3 in excess of the exactly desired quantity, will be overflowed thereinto through the openings 14. The valve 5 is then latched by upward movement of the rod 40 against the force of the counterweight 42, to permit the flow of liquid through the pipe 4 into the interior of the tank 3. At the point when the balance arm 33 is counterbalanced by the weight of liquid in the tank 3, the latch 49 will be actuated to release the rod and the flow of liquid through the pipe will be terminated by the consequent closure of the valve 5. The excess liquid will then flow through the tubular member 7 and off through the opening 15, exhausting through the pipe 21—a. When the overflow has ceased, exactly the desired amount of liquid will remain in the tank 3, and this may then be exhausted through the outlet 6.

It is of course understood that the invention is susceptible to numerous modifications

I claim:

1. A liquid-measuring apparatus comprising a tank arranged on knife edges, means for supplying a liquid to said tank, mechanism including an adjustable balance arm cooperable with said knife edges to balance said tank when a selected quantity of liquid has been delivered, means actuated by said mechanism for discontinuing the first-mentioned means, thus terminating the supply of liquid, an adjustable constantly open overflow in said tank through which the liquid exhausts after it has reached a selected level, and means for vertically adjusting said overflow, whereby the balance arm can be set to balance a volume of liquid slightly in excess of the desired volume, and the exact measurement can then be determined by the setting of the overflow.

2. In a liquid measuring apparatus, pivotal means for weighing a selected quantity of liquid, means for supplying liquid to said pivotal means, and means operable as an incident to pivotal movement of said first-mentioned means, after a selected weight of liquid has been supplied to the said first-mentioned means, to discontinue the said second-mentioned means, said last mentioned means comprising a substantially vertically arranged gravity-operated arm, a casing about a portion of said arm, a sleeve fixed about said arm within said casing, a coil spring about said arm and retained between the lower end of said casing and the said sleeve, thus providing a shock absorber for the arm during its downward movement, a valve in said second-mentioned means and adapted to close when the arm is in its lowermost position, a linkage operatively connecting said valve and said arm, and a latch member normally retaining said arm in its uppermost position, but operable as an incident to pivotal movement of said first-mentioned means to release the arm whereby the valve is closed and a supply of liquid is discontinued.

3. In a liquid measuring apparatus, a scale including a balance arm, a tank supported therefrom, a second tank arranged interiorly of said first-mentioned tank, means for supplying a liquid to said second-mentioned tank including a valve, means controlled by the balance arm for closing said valve, a substantially vertically arranged tubular member extending through said first-mentioned tank to the interior of said second-mentioned tank, said tubular member being vertically adjustable and having an opening adjacent the upper end thereof at the interior of said second-mentioned tank, and a similar opening adjacent the lower end of said tubular member between the bottoms of said first and second mentioned tanks; whereby the liquid in the first-mentioned tank is caused to overflow through the upper opening in the tubular member, after said member has been adjusted to its predetermined height, and is then exhausted through said second-mentioned opening into the first-mentioned tank, and means communicating with said second-mentioned tank, for exhausting the latter.

4. A liquid measuring apparatus comprising a tank arranged on knife edges, means for supplying a liquid to said tank, mechanism including an adjustable balance arm cooperable with said knife edges to balance said tank when a selected weight of liquid has been delivered, means actuated by said mechanism for discontinuing the first-mentioned means, thus terminating the supply of liquid, an adjustable constantly open overflow in said tank through which the liquid exhausts after it has reached a selected level, means for vertically adjusting said overflow, and a secondary tank supported from said knife edges through said balance arm for receiving the overflow from the first-named tank whereby the balance arm can be set to balance a volume of liquid slightly in excess of the desired volume, and the exact measurement can then be determined by the setting of the overflow.

5. In liquid measuring apparatus, a weighing scale including a balance arm, a tank supported from said balance arm, means for supplying liquid to the tank comprising a valve, means controlled by said balance arm for closing said valve, a bushing mounted at one end of said tank and having threads arranged interiorly thereof, a substantially vertically arranged rotatable tubular member in said tank, and having an elongated threaded rod attached to the upper end thereof, and adapted to mesh with the threads of said bushing, said member extending outwardly through the lower end of said tank, openings arranged adjacent the upper and lower extremities of said tubular member, respectively, means for rotating said tubular member, a scale depending from said tank, and an indicating means on said tubular member, cooperable with said scale, for definitely determining the height of said tubular member, and consequently the height of the upper opening therein, whereby the liquid entering the said tank will overflow after it reaches the selected level of said upper opening and will exhaust through the lower opening, thus accurately determining the volume of liquid in the tank.

HARRY READ.